UNITED STATES PATENT OFFICE.

HANS BUCHTALA, OF GRATZ, AUSTRIA-HUNGARY, ASSIGNOR TO DR. BAYER ÉS TÁRSA (A FIRM COMPRISING DR. DEZSÖ BAYER AND RUDOLPH BRAUN DE BELATIN AS ITS MEMBERS, DOING BUSINESS AT BUDAPEST, AUSTRIA-HUNGARY).

MERCURY PREPARATION FOR THERAPEUTIC PURPOSES AND PROCESS OF PRODUCING THE SAME.

1,180,694.  Specification of Letters Patent.  Patented Apr. 25, 1916.

No Drawing.  Application filed June 5, 1913. Serial No. 771,796.

*To all whom it may concern:*

Be it known that I, HANS BUCHTALA, a subject of the Emperor of Austria-Hungary, residing in Gratz, Austria-Hungary, have invented a certain new and useful Mercury Preparation for Therapeutic Purposes and Process of Producing the Same, of which the following is a specification.

The object of this invention is to provide a therapeutic mercurial preparation characterized by the uniformity and stability of its alkaline solutions, and one which in its application is free from irritation and smarting.

The present improvement provides a mercury-tyrosin compound, which brings out fully the therapeutic mercurial effects while at the same time there is repressed or avoided as far as possible an effect injurious to the bodily health.

By heating a solution of tyrosin (β-para-hydroxyphenyl-α-aminopropionic acid) in water with freshly precipitated mercuric oxid until the color of the mercuric oxid disappears, there arises a milky liquid out of which there separates a white precipitate. The same precipitate is obtained by boiling the aqueous tyrosin solution in the presence of mercuric salts of weak acids, such as for example, mercuric acetate, which are hydrolyzed in hot aqueous solution. In this case a bivalent mercury ion may be split off which enters directly into reaction with the tyrosin.

Examples.

I. 5.43 grams tyrosin are dissolved in 4 liters of hot water, to the hot solution 6.48 grams of mercuric oxid in the freshly precipitated condition are added and heated until the precipitate has assumed a pure white color. The reaction is generally completed in from two to two and a half hours.

II. 5.43 grams tyrosin are dissolved in 4 liters of hot water, to the hot solution 9.54 grams of mercuric acetate dissolved in water are added, and the solution is heated for two to two and a half hours on the water bath. After the cooling the centrifugal drying machine is employed, the precipitate is washed with water and dried in the drying tank at about fifty degrees. Result, 8.5 grams. The empirical composition attained by analysis is $C_9H_9O_3NHg$. This compound is almost insoluble in water and on heating melts with decomposition; it is soluble in soda and potash lye and there is attained in the solution of 0.1 gram of material suspended in 9 cubic centimeters of water, with the addition of 1.05 cubic centimeters of 1% soda lye or with the addition of 2 cubic centimeters of 1% potash lye, a clear stable solution. This method and the resultant product are claimed in my copending application Serial No. 840,454, filed May 23, 1914, filed as a division of this present application.

The body itself, as well as its alkaline solutions are not darkened by sulfid of hydrogen. In cold dilute mineral acids the body is insoluble; on heating the same with mineral acid there is obtained in consequence of the opening up of the tyrosin a solution from which the mercury is separated off by means of sulfureted hydrogen as a sulfid.

In organic solvents, such as alcohol, glycerin, benzol, ether, chloroform, bisulfid of carbon, as well as in organic acid, such as acetic acid, furthermore, in fats and oils, the body is insoluble, on the other hand it is soluble in small quantities and under continuous boiling in aqueous solutions of tartaric acid.

The alkaline solutions on concentration of something over 1% show a quality in a short time of becoming viscous and finally of stiffening like colloids. If, in a vacuum over concentrated sulfuric acid the water content is partially removed from the alkaline solutions, there is attained a colloidal body which is not clearly soluble in water. If in the same manner the entire water content is removed from the alkaline solution, then there is obtained a pulverulent body which is insoluble in water. The same thing takes place if the alkaline solution is mixed with so much alcohol that a precipitate takes place. If the alkaline solutions of the new mercurial compound are neutralized with mineral acids or acetic acid, then there is obtained a white precipitate which shows unchanged the original qualities of the new compound.

Both the aqueous alkaline solution of the tyrosin mercurial compound and also the powder itself are employed as therapeutic means. Previously known mercurial combinations with amin acids, glycocol, alamin and asparagin, while characterized by the fact that their solutions do not precipitate albumen, have not found greater practical use for the reason that their solutions very easily and rapidly decompose.

The mercurial combination of tyrosin obtained in accordance with the present invention is preëminently adapted for therapeutic purposes owing to the stability of its alkali solution. These qualities which distinguish the substance obtained according to the present process are dependent upon its basically novel composition. The assumption is, as a matter of fact justified, that the two valences of the mercury replace the hydrogen on the one hand of the hydroxyl group in the benzol nucleus, on the other hand replace the hydrogen of the amin group in the side chain.

Introduced into the organism in different manners both internally and also intramuscularly as well as especially intravenously, in consequence of its constitution made up of substances related to albumen, it shows no injurious effect. But also in external application, and in fact to the mucous membranes, it distinguishes itself by an absence of smarting under a strong bactericidal and prompt therapeutic action.

This mercury compound with albumen derivative, in the gonorrhea-therapy can be injected as a pure disinfectant without smarting or astringent effect.

The process of preparing the mercurial preparation by the aid of mercuric oxid, is claimed in my divisional application, Serial No. 46,203, filed August 18, 1915.

I claim as my invention:—

1. The method of producing a therapeutic mercurial preparation, which consists in heating tyrosin in an aqueous solution with mercuric salts of weak acids.

2. The method of producing a therapeutic mercurial preparation, which consists in heating tyrosin in an aqueous solution with mercuric acetate.

3. The method of producing a therapeutic mercurial preparation, which consists in heating tyrosin in an aqueous solution with mercuric salts of weak acids, and then dissolving the product obtained thereby in an alkaline solution.

4. The method of producing a therapeutic mercurial preparation, which consists in heating tyrosin in an aqueous solution with mercuric acetate, and then dissolving the product obtained thereby in an alkaline solution.

5. A stable compound of tyrosin and mercury for therapeutic use having the empirical formula $C_9H_9O_3NHg$.

In witness whereof, I have hereunto signed my name in the presence of two subscribing witnesses.

HANS BUCHTALA.

Witnesses:
JOSEF FEDLIČKA,
AUGUST FUGGER.